US012625820B2

(12) United States Patent
Duval

(10) Patent No.: US 12,625,820 B2
(45) Date of Patent: May 12, 2026

(54) CIRCULAR BUFFER PARTITIONS

(71) Applicant: Micron Technology, Inc., Boise, ID (US)

(72) Inventor: Olivier Duval, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 150 days.

(21) Appl. No.: 17/697,541

(22) Filed: Mar. 17, 2022

(65) Prior Publication Data

US 2023/0297516 A1 Sep. 21, 2023

(51) Int. Cl.
G06F 12/1045 (2016.01)
G06F 3/06 (2006.01)

(52) U.S. Cl.
CPC ........ G06F 12/1045 (2013.01); G06F 3/0604 (2013.01); G06F 3/0631 (2013.01); G06F 3/0673 (2013.01)

(58) Field of Classification Search
CPC .. G06F 12/1045; G06F 3/0604; G06F 3/0631; G06F 3/0673
USPC ........................................................... 711/3
See application file for complete search history.

(56) References Cited

U.S. PATENT DOCUMENTS

| | | | | |
|---|---|---|---|---|
| 8,953,269 | B1 * | 2/2015 | Hamilton ............. | G11B 19/041 |
| | | | | 360/48 |
| 11,016,667 | B1 * | 5/2021 | Sears ..................... | G06F 3/0607 |
| 11,429,293 | B1 * | 8/2022 | Vankamamidi ....... | G06F 3/0659 |
| 2010/0070729 | A1 * | 3/2010 | Ng ......................... | G06F 3/0679 |
| | | | | 711/E12.001 |
| 2010/0191897 | A1 * | 7/2010 | Zhang .................. | G06F 12/0246 |
| | | | | 711/170 |
| 2016/0246544 | A1 * | 8/2016 | Nicol ................... | G06F 12/0868 |
| 2019/0235759 | A1 * | 8/2019 | Sen .......................... | G06F 3/065 |
| 2019/0278482 | A1 * | 9/2019 | Dubeyko .............. | G06F 3/0659 |
| 2021/0109857 | A1 * | 4/2021 | Kumar ................. | H04N 21/226 |

* cited by examiner

*Primary Examiner* — Gautam Sain
(74) *Attorney, Agent, or Firm* — Holland & Hart LLP

(57) ABSTRACT

Methods, systems, and devices for circular buffer partitions are described. A memory device may include one or more sets of memory cells configured to operate as circular buffers. In some cases, upon receiving w rite command, the memory device (e.g., a controller of the memory device) may write data to the circular buffer based on a location of a cursor (e.g., a header pointer). After a write operation, the cursor may be incremented such that, upon receiving a subsequent write command, data may be written to the circular buffer beginning at the location of the cursor. In some examples, the circular buffer may be associated with one or more partitions (e.g., snapshot partitions) such that, upon the occurrence of a triggering event, a subset of data stored to the circular buffer may be stored to the partition (e.g., to a different portion of the memory device).

23 Claims, 6 Drawing Sheets

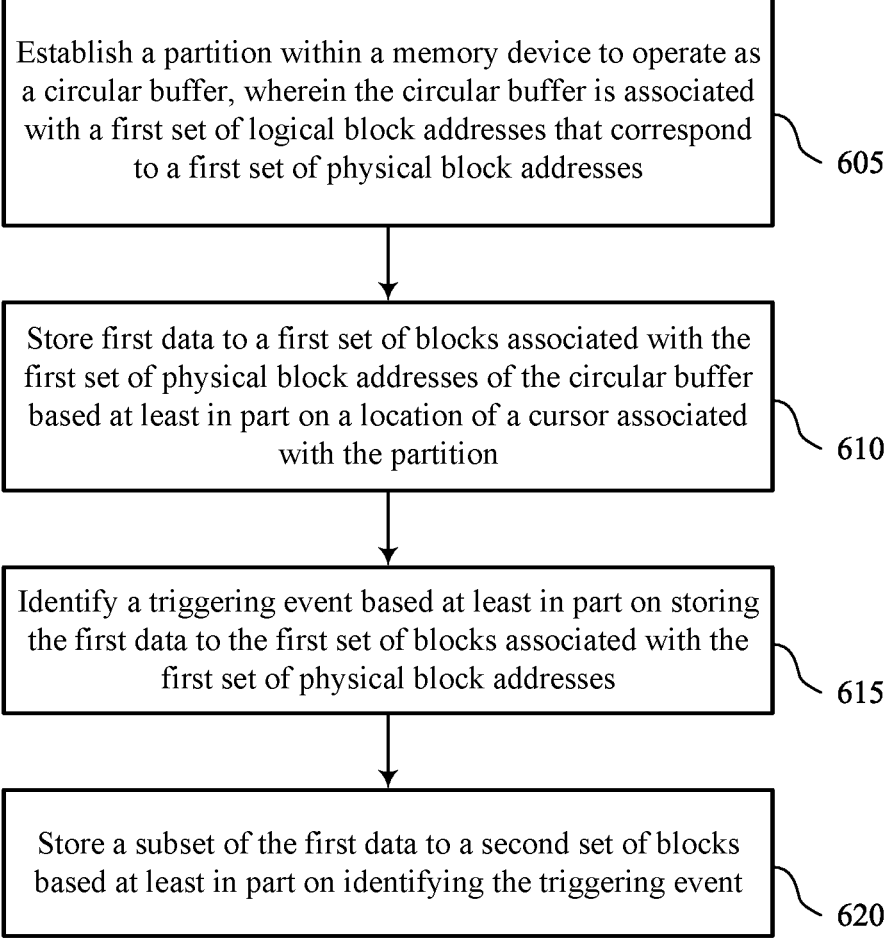

Establish a partition within a memory device to operate as a circular buffer, wherein the circular buffer is associated with a first set of logical block addresses that correspond to a first set of physical block addresses

605

Store first data to a first set of blocks associated with the first set of physical block addresses of the circular buffer based at least in part on a location of a cursor associated with the partition

610

Identify a triggering event based at least in part on storing the first data to the first set of blocks associated with the first set of physical block addresses

615

Store a subset of the first data to a second set of blocks based at least in part on identifying the triggering event

CIRCULAR BUFFER PARTITIONS

FIELD OF TECHNOLOGY

The following relates to one or more systems for memory, including circular buffer partitions.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

BRIEF DESCRIPTION OF THE DRAWINGS

FIG. 6 shows a flowchart illustrating a method or methods that support circular buffer partitions in accordance with examples as disclosed herein.

DETAILED DESCRIPTION

Figure 1:
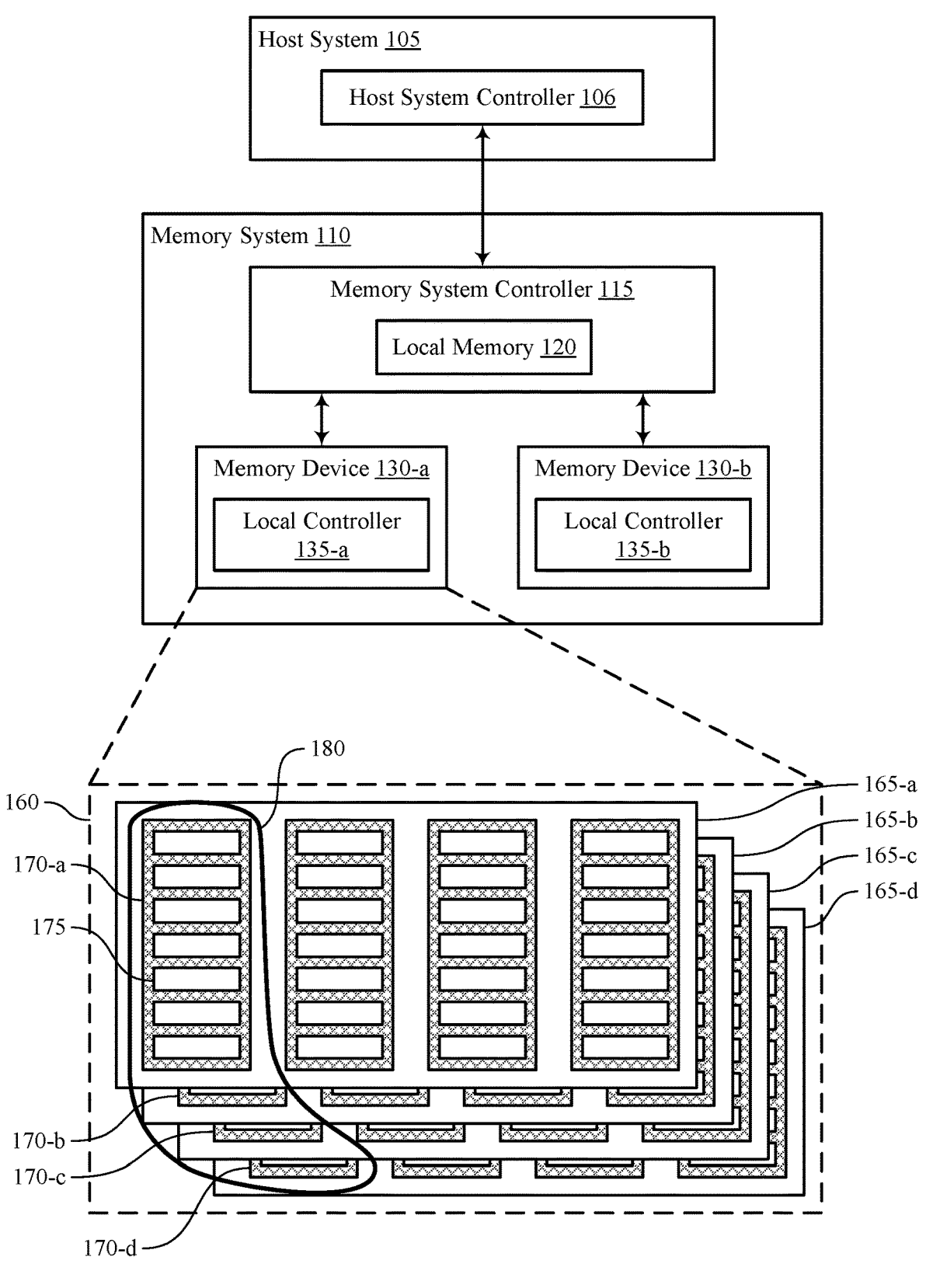
FIG. 1 illustrates an example of a system that supports circular buffer partitions in accordance with examples as disclosed herein.

A memory system may include one or more memory devices (e.g., not-and (NAND) devices). In some examples, the memory devices may operate in accordance with a black box configuration, which may also be referred to as a sequential write configuration or a strictly sequential write configuration. A black box may be an example of a memory device or a portion of a memory device that allows data (e.g., large quantities of data) to be written continuously and sequentially in a secure manner (e.g., write protected). In some examples, the black box configuration may support high-bandwidth operations and may be implemented to store data (e.g., video data, sensor data) in a continuous manner. For example, a memory device operating according to a black box configuration may use pointers to identify locations to store information instead of using logical addresses and physical addresses.

In some cases, a memory device operating in a black box or strictly sequential write configuration may receive an access command (e.g., write command) that may include a logical block address (LBA). The memory device may convert the LBA to a physical address to facilitate data storage using a logical-to-physical (L2P) table. For example, the memory device may convert the LBA associated with data to a physical address and then store the data at the location indicated by the physical address. Storing a L2P table and converting LBAs to physical addresses may consume memory resources (e.g., non-volatile memory cells), take a considerable amount of time, and continuously writing data to memory cells of the memory device may contribute to the aging of the memory device. Specifically, non-volatile memory cells may support a finite quantity of operations during their useful life, and, accordingly, continuously writing data to the cells may adversely affect the useful life of the memory device. Thus, methods to improve the life and efficiency of memory devices that support black box operations may be desired.

Techniques, methods, and devices are described herein for improving the life and efficiency of memory devices that support black box operations. For example, the life and efficiency may be improved by partitioning one or more sections of the memory device to operate as a circular buffer. As described herein, a circular buffer may refer to one or more memory cells that are effectively connected end-to-end. That is, data may be continuously written to a circular buffer such that, after data is written to a last memory cell in a circular buffer, data stored to a first memory cell in the circular buffer may be overwritten.

A circular buffer may include a set of physical blocks that correspond to a set of LBAs. In some cases, the memory device may perform sequential write operations to the circular buffer without implementing an L2P table, in which, for example, a first set of data may be written beginning at a location (e.g., at a first physical block) in the circular buffer as indicated by a cursor (e.g., header pointer). After writing the first set of data, the cursor may be incremented to a next location (e.g., a next position) in the circular buffer and a second set of data may be written beginning at that location.

Moreover, the memory device may utilize one or more snapshot partitions to prevent some data from being overwritten by operations and looping-back of the circular buffer (e.g., to prevent some data written to a circular buffer from being overwritten). For example, one or more physical blocks of memory cells may be utilized for a snapshot partition such that, when a triggering event (e.g., a time interval, a cursor location, some external trigger such as a motion sensor being activated) is identified, a subset of data from a circular buffer may be stored to the snapshot partition. Accordingly, when data stored to the circular buffer is overwritten, data stored to the snapshot partition may be preserved. By utilizing a circular buffer for some black box operations, the memory device may perform write operations without the use of a L2P table, which may improve the overall life and performance of the memory device. Moreover, by utilizing a snapshot partition within a circular buffer, data that would otherwise be overwritten due to the circular nature of the buffer may be preserved.

Figure 2:
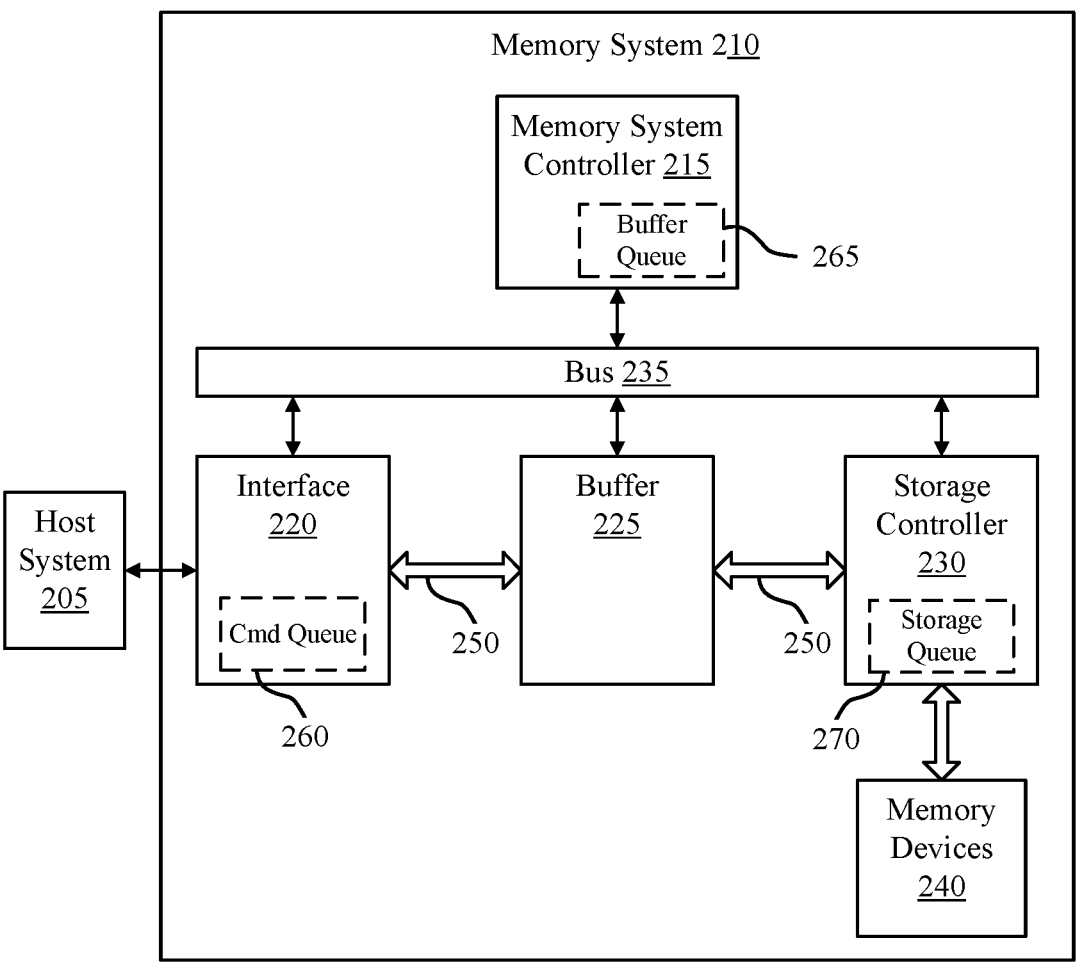
FIG. 2 illustrates an example of a system that supports circular buffer partitions in accordance with examples as disclosed herein.

Features of the disclosure are initially described in the context of systems, devices, and circuits with reference to FIGS. 1 and 2. Features of the disclosure are described in the context of systems and process flows with reference to FIGS. 3 and 4. These and other features of the disclosure are further illustrated by and described in the context of an apparatus diagram and flowchart that relate to circular buffer partitions with reference to FIGS. 5 and 6.

FIG. 1 illustrates an example of a system 100 that supports circular buffer partitions in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105).

Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EE-PROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

The system 100 may include any quantity of non-transitory computer readable media that support circular buffer partitions. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some examples, the memory system 110 may operate in accordance with a black box configuration where data is continuously written to one or more memory devices 130. For example, the black box configuration may support high bandwidth and secure (e.g., write-protected) operations, such as storing continuous streams of data (e.g., video feed data, sensor data) while supporting limited read access. In some cases, one or more portions of a memory device 130 may be configured as a circular buffer such that the memory system controller 115 may continuously write (and overwrite) data to the respective circular buffer.

Moreover, the circular buffers may each support one or more snapshot partitions as described herein. For example, a circular buffer may be associated with a set of blocks 170-*a* such that, when data is received from the host system 105, the memory system controller 115 writes data to the set of blocks 170-*a* according to a location (e.g., a position) of a cursor associated with the set of blocks 170-*a*.

In some examples, upon the occurrence of a triggering event, a subset of the data stored to the set of blocks 170-*a* (e.g., a subset of the data stored to the circular buffer) may be stored to a snapshot partition. In some instances, the snapshot partition may be associated with a set of blocks 170-*b* such that, when data stored to the set of blocks 170-*a* is overwritten, the subset of data (e.g., the data stored to the snapshot partition) may be preserved. By utilizing a circular buffer for some black box operations, the memory system 110 may perform write operations without the use of a L2P table, which may improve its overall life and performance for some use-cases (e.g., storing continuous streams of data). Moreover, by utilizing a snapshot partition within a circular buffer, data that would otherwise be overwritten due to the circular nature of the buffer may be preserved.

FIG. 2 illustrates an example of a system 200 that supports circular buffer partitions in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands, write commands, get commands, set commands, etc.). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the storage controller 230 may obtain from the storage queue 270 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some examples, the memory system 210 may operate in accordance with a black box configuration where data is continuously written to one or more memory devices 240. For example, the black box configuration may support high bandwidth and secure (e.g., write-protected) operations, such as storing continuous streams of data (e.g., video feed data, sensor data) while supporting limited read access. In some cases, one or more portions of a memory device 240 may be configured as a circular buffer such that the memory system controller 215 may continuously write (and over-write) data to the respective circular buffer.

Moreover, the circular buffers may each support one or more snapshot partitions as described herein. For example, a circular buffer may be associated with a set of blocks (e.g., a first set of blocks) such that, when data is received from the host system 205, the memory system controller 215 writes data to the set of blocks according to a location (e.g., a position) of a cursor associated with the set of blocks.

In some examples, upon the occurrence of a triggering event, a subset of the data stored to the set of blocks (e.g., a subset of the data stored to the circular buffer) may be stored to a snapshot partition. In some instances, the snapshot partition may be associated with a set of blocks (e.g., a second set of blocks; a different set of blocks) such that, when data stored to the first set of blocks is overwritten, the subset of data (e.g., the data stored to the snapshot partition) may be preserved. By utilizing a circular buffer for certain black box operations, the memory system 210 may perform write operations without the use of a L2P table, which may improve its overall life and performance. Moreover, by utilizing a snapshot partition within a circular buffer, data that would otherwise be overwritten due to the circular nature of the buffer may be preserved.

Figures 3A, 3B:
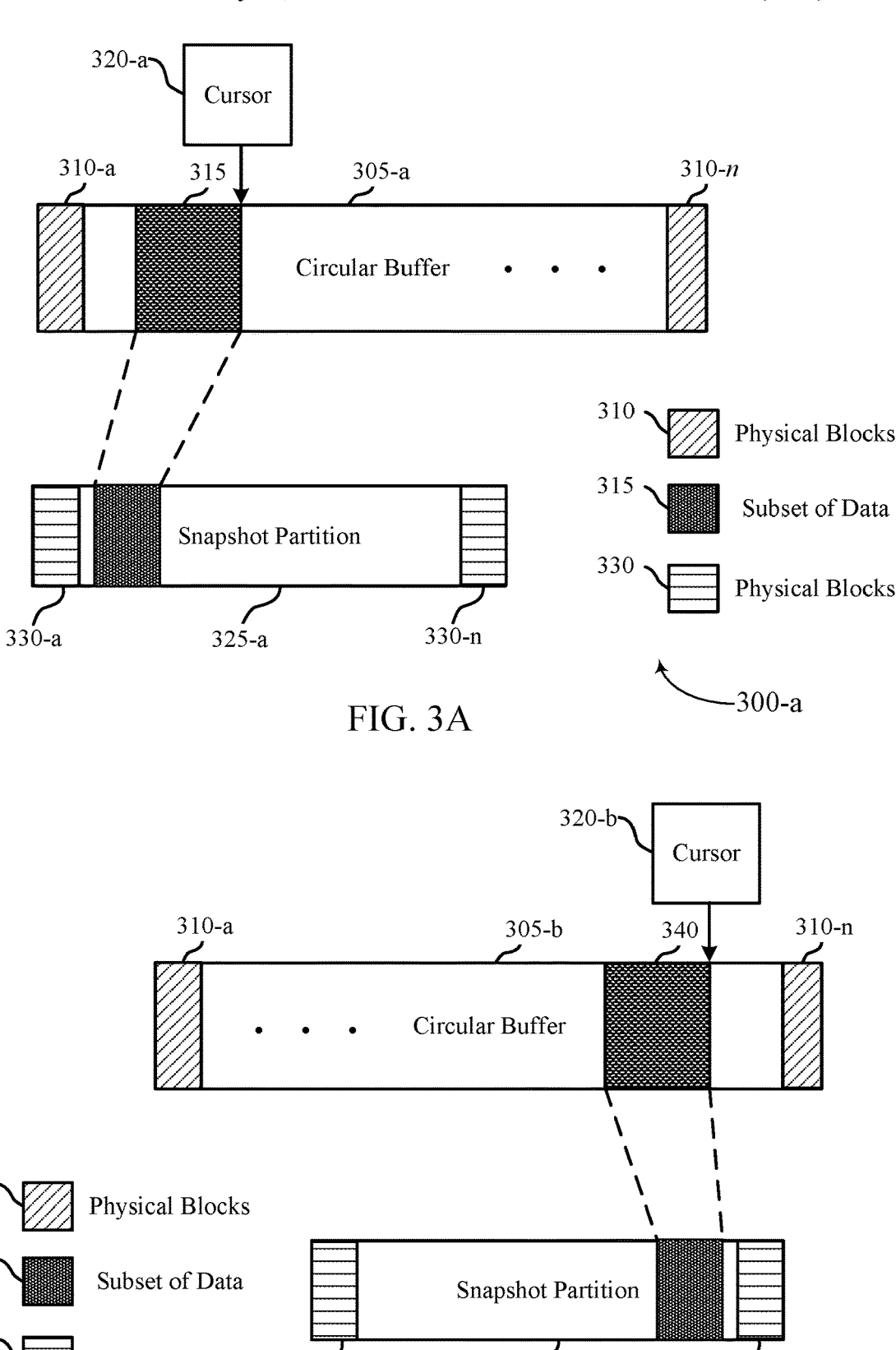
FIGS. 3A and 3B illustrate block diagrams that support circular buffer partitions in accordance with examples as disclosed herein.

FIG. 3A illustrates an example of a block diagram 300-a that supports circular buffer partitions in accordance with examples as disclosed herein. The block diagram 300-a may be part of a memory system as described with reference to FIGS. 1 and 2. The block diagram 300-a may include a circular buffer 305-a and a snapshot partition 325-a, which may be implemented in one or more memory devices as described with reference to FIGS. 1 and 2. The memory system may also include other partitions that use L2P tables and other ways for writing and reading data using logical addresses and physical addresses. The circular buffer 305-a and the snapshot partition 325-a may operate in accordance with a black box configuration as described with reference to FIG. 1. By utilizing a circular buffer 305-a for some black box operations (e.g., for some strictly sequential write operations), the associated memory system may perform write operations without the use of a L2P table, which may improve its overall endurance and performance. Moreover, by utilizing a snapshot partition 325-a within a circular buffer 305-a, data that would otherwise be overwritten due to the circular nature of the buffer may be preserved.

In some examples, the circular buffer 305-a and the snapshot partition 325-a may be established based on an associated memory controller receiving a command (e.g., a set command; a first command). Upon receiving a set command, a first quantity of physical blocks may be designated to operate as the circular buffer 305-a and a second quantity of physical blocks may be designated to operate as the snapshot partition 325-a. The set command may specify the size of the circular buffer 305-a (e.g., quantity of physical blocks) and a range of associated LBAs.

Additionally or alternatively, the set command may specify a quantity of snapshot partitions 325-a included within the circular buffer 305-a, a size of the snapshot partition(s) 325-a (e.g., quantity of physical blocks associated with each snapshot partition 325-a), and a position of the snapshot partition(s) 325-a within the circular buffer 305-a. In some examples, the set command may also specify one or more triggering events for saving data to a snapshot partition 325-a. In some examples, the set configuration indicates a triggering event configuration to the system 300, where the triggering event may cause the system 300 to store data from the circular buffer 305-a to the snapshot partition 325-a.

In some cases, the set command may establish more than one circular buffer 305-a and one snapshot partition 325-a. For example, a set command may establish multiple circular buffers 305-a, multiple snapshot partitions 325-a within a circular buffer 305-a, or both. Although described with reference to a set command, in some examples the circular buffer 305-a and snapshot partition 325-a may be configured during manufacturing of the associated memory device, or otherwise may be established absent a specific command.

The circular buffer 305-a may be associated with physical blocks 310-a through 310-n, where the physical blocks 310-a through 310-n are a subset of physical blocks included in a memory device. The physical blocks 310-a through 310-n may each correspond to a respective LBA. That is, physical block 310-a (e.g., physical block 0) may correspond to LBA 0 and physical block 310-n (e.g., physical block n) may correspond to LBA n. Thus, the circular buffer 305-a may be associated with a range of LBAs that correspond to a range of physical blocks (e.g., physical block 310-a through physical block 310-n).

Associating each physical block with a respective LBA may allow for data to be written to the circular buffer 305-a sequentially and without the use of a L2P table and reuse write commands typically used for partitions that use L2P tables. For example, data may be written to the circular buffer 305-a using a cursor 320-a (e.g., a header pointer) instead of using an L2P table. The memory system may receive a special command for the partition that uses the circular buffer configuration. Alternatively, one or more logical addresses may be associated with partition that uses the circular buffer configuration. The memory system may write data to the partition that uses the circular buffer configuration in response to receiving a write command that includes a logical address from the one or more logical address that are associated with the partition that uses the circular buffer configuration. The cursor 320-a may indicate a location (e.g., a physical block; a physical address) in the circular buffer 305-a where data is to be written to in response to receiving a command to write to the partition that uses the circular buffer configuration. That is, when an associated memory device receives a command (e.g., a write command; a third command), first data may be written to the circular buffer 305-a beginning at a location of the cursor 320-a and may be written sequentially from thereon. In some examples, the first data may be written to the circular buffer 305-a at a first time.

After the first data is written to the circular buffer 305-a, a location of the cursor 320-a may be updated such that second data (e.g., data associated with a subsequent write command) is written to the circular buffer 305-a immediately following the first data. By writing data to the circular buffer 305-a in such a manner, a memory controller may not utilize a L2P table when writing to the circular buffer 305-a. Instead, when a write command is received, the memory controller may determine whether an associated LBA is within a range of LBAs associated with the circular buffer 305-a. If the LBA is within the range, the associated data may be written to the circular buffer 305-a based on a location of the cursor 320-a.

In some instances, due to its circular nature, the circular buffer 305-a may repeat the described procedure to perform sequential write operations. For example, the cursor 320-a may reach a last physical address in the circular buffer 305-a (e.g., physical block 310-n), and, after storing data at the last physical address, the cursor 320-a may increment (e.g., wrap-around) to a first physical address in the circular buffer 305-a (e.g., physical block 310-a). Data previously written to the circular buffer 305-*a* may then be overwritten by subsequent write operations. In some instances, it may be beneficial for some data stored to the circular buffer 305-*a* to be preserved. Accordingly, as described herein, data stored to a snapshot partition 325-*a* may be preserved based on the occurrence of a triggering event.

In some cases, a memory controller associated with the circular buffer 305-*a* and snapshot partition 325-*a* may identify a triggering event for storing data to the snapshot partition 325-*a*. For example, a triggering event may include a location of the cursor 320-*a*, a quantity of data written to the circular buffer 305-*a*, a duration of a write operation, or the occurrence of another event. For exemplary purposes only, as described with reference to FIG. 3A, a triggering event may occur based on a location of the cursor 320-*a*. Accordingly, when a location of the cursor 320-*a* passes a particular address (e.g., a particular physical block 310), a subset of the data 315 stored to the circular buffer 305-*a* (e.g., data stored to a subset of the circular buffer 305-*a*) may be stored to the snapshot partition 325-*a*.

For example, first data may be stored to the circular buffer 305-*a* (e.g., first data may be stored to blocks 310-*a* through 310-*n*). When the cursor 320-*a* surpasses a particular address (e.g., block 310-*e*, for example), the subset of data 315 may be stored to the snapshot partition 325-*a*. As described herein, the size of the subset of data 315 may be specified by the set command or may otherwise be established based on one or more settings of the associated memory device. Accordingly, the subset of data 315 may include data from one or more of the physical blocks 310.

A triggering event may also be some indication that is external to the memory system. For example, if the circular buffer is used as part of a security system, a motion sensor or other event detection may trigger a snapshot of the circular buffer being saved. In such examples, a host system may detect a triggering event and may request that the memory system save a snapshot of the circular buffer 305-*a* in the snapshot partition 325-*a*.

The snapshot partition 325-*a* may include physical blocks 330-*a* through 330-*n*. In some examples, the physical blocks 330 of the snapshot partition 325-*a* may be different than the physical blocks 310 of the circular buffer 305-*a*. For example, the physical blocks 330 may be located in a different portion of the memory device (e.g., a different bank or a different array) or may otherwise be designated as blocks 330 for one or more snapshot partitions 325-*a*.

Additionally or alternatively, the snapshot partition 325-*a* may include fewer physical blocks than the circular buffer 305-*a*. In some cases, the snapshot partition 325-*a* may be organized into one or more slots, with each slot including one or more of the physical blocks 330. A slot may store the subset of data 315 following the triggering event. The quantity of slots and size and location (e.g., physical address) of each slot in the snapshot partition 325-*a* may be configured based on a set command, as described herein.

As described herein, the subset of data 315 may be written to the snapshot partition 325-*a* based on the triggering event. In some instances, the subset of data 315 may be copied from the circular buffer 305 (e.g., the subset of data 315 may remain stored to the circular buffer 305-*a* after being written to the snapshot partition 325-*a*). In some instances, the snapshot partition 325-*a* may also maintain a cursor (not shown) and thus the subset of data 315 may be written to the snapshot partition 325-*a* based on a location of its cursor. The cursor associated with the snapshot partition 325-*a* may then increment to a next slot in the snapshot partition 325-*a* after the subset of data 315 is written. Accordingly, in some instances, the snapshot partition 325-*a* may operate similarly as the circular buffer 305-*a* (e.g., in a circular manner).

In some examples the memory device associated with the circular buffer 305-*a* and the snapshot partition 325-*a* may receive a command (e.g., a get command; a second command) from a host system. The get command may be a request for the current location of the cursor 320-*a* (e.g., a current physical address of the cursor 320-*a*). In some examples, by knowing a location of the cursor 320-*a*, the host system may be able to read a desired portion of the circular buffer 305-*a* (e.g., without having to read the contents of the entire circular buffer 305-*a*). By utilizing a circular buffer 305-*a* for some black box operations (e.g., for some strictly sequential write operations), the associated memory system may perform write operations without the use of a L2P table, which may improve its overall life and performance. Moreover, by utilizing a snapshot partition 325-*a* within a circular buffer 305-*a*, data that would otherwise be overwritten due to the circular nature of the buffer may be preserved.

FIG. 3B illustrates an example of a block diagram 300-*b* that support circular buffer partitions in accordance with examples as disclosed herein. In some examples, the block diagram 300-*b* may illustrate an example of the block diagram 300-*a* as described in FIG. 3A being operated at a second time (e.g., after a first time as described with reference to FIG. 3A).

The circular buffer 305-*b* may illustrate an operation of the circular buffer 305-*a* at a second time. That is, the circular buffer 305-*b* may be associated with physical blocks 310-*a* through 310-*n*, where the physical blocks 310-*a* through 310-*n* are a subset of physical blocks included in a memory device. The physical blocks 310-*a* through 310-*n* may each correspond to a respective LBA. That is, physical block 310-*a* (e.g., physical block 0) may correspond to LBA 0 and physical block 310-*n* (e.g., physical block n) may correspond to LBA n. Thus, the circular buffer 305-*a* may be associated with a range of LBAs that correspond to a range of physical blocks (e.g., physical block 310-*a* through physical block 310-*n*). In some examples, the cursor 320-*b* may have been incremented n times relative to the cursor 320-*a*. For example, the associated memory device may have received one or more write commands (e.g., third commands) resulting in the cursor 320-*b* being incremented relative to FIG. 3A.

In some cases, a memory controller associated with the circular buffer 305-*b* and snapshot partition 325-*b* may identify a triggering event for storing data to the snapshot partition 325-*b*. For example, a triggering event may include a location of the cursor 320-*b*, a quantity of data written to the circular buffer 305-*b*, a duration of a write operation, or the occurrence of another event. For exemplary purposes only, a triggering event may occur based on a location of the cursor 320-*b*. Accordingly, when a location of the cursor 320-*a* passes a particular address (e.g., a particular physical block 310), a subset of the data 340 stored to the circular buffer 305-*b* (e.g., data stored to a subset of the circular buffer 305-*b*) may be stored to the snapshot partition 325-*b*.

In some instances, the subset of data 340 may be copied from the circular buffer 305-*b* (e.g., the subset of data 340 may remain stored to the circular buffer 305-*b* after being written to the snapshot partition 325-*b*). Additionally or alternatively, the subset of data 340 may be stored along with the subset of data 315 as described with reference to FIG. 3A. The snapshot partition 325-*b* may also maintain a cursor (not shown) and thus the subset of data 340 may be written after the subset of data 315 (e.g., to an address subsequent to the address storing the subset of data 315). In other examples, although not shown in FIG. 3B, the snapshot partition 325-*b* may operate in a circular manner, which may result in the subset of data 315 being overwritten by the subset of data 340. Although data stored to the snapshot partition 325-*b* may be overwritten, the snapshot partition 325-*b* may be subject to fewer write commands than the circular buffer 305-*b*, thus resulting in its data being overwritten less frequently.

Figure 4:
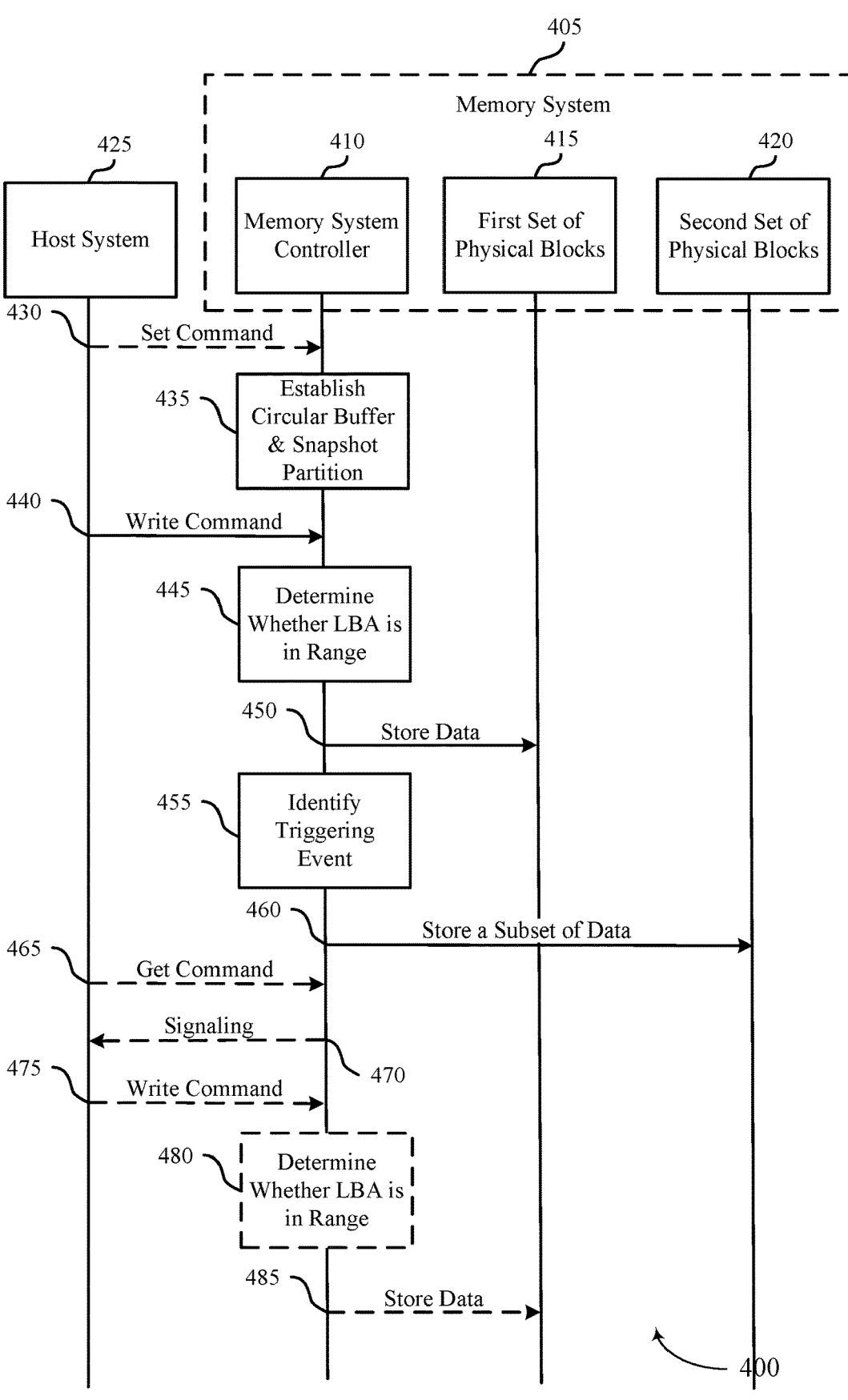
FIG. 4 illustrates an example of a process flow diagram that supports circular buffer partitions in accordance with examples as disclosed herein.

FIG. 4 illustrates an example of a process flow diagram 400 that supports circular buffer partitions in accordance with examples as disclosed herein. The process flow diagram 400 may illustrate operations of a memory system 405 and a host system 425. The memory system 405 may include a memory system controller 410, a first set of first set of physical blocks 415, and a second set of second set of physical blocks 420. In some examples, the memory system 405 and the host system 425 may be examples of corresponding devices described with respect to FIGS. 1 and 2. Additionally or alternatively, the first set of physical blocks 415 may be associated with a circular buffer 305 and the second set of physical blocks may be associated with a snapshot partition 325 as described with reference to FIGS. 3A and 3B.

Alternative examples of the following process flow may be implemented, where some steps are performed in a different order than described or not performed. In some cases, steps may include additional features not mentioned below, or further steps may be added. By utilizing a circular buffer for some black box operations (e.g., for some strictly sequential write operations), the associated memory system may perform write operations without the use of a L2P table, which may improve its overall life and performance. Moreover, by utilizing a snapshot partition within a circular buffer, data that would otherwise be overwritten due to the circular nature of the buffer may be preserved.

In some cases, the memory system 405 may include one or more memory devices (e.g., NAND memory devices). In some examples, the memory devices may include a plurality physical of blocks, in which, for example, a memory device may include the first set of physical blocks 415 and the second set of physical blocks 420. Additionally or alternatively, the memory system controller 410 may be configured to perform access operations (e.g., read operations, write operation) to the first set of physical blocks 415 and the second set of physical blocks 420.

At 430, the host system 425 may transmit a set command (e.g., a first command) to the memory system 405. In some examples, as described herein, a set command may establish a circular buffer and a snapshot partition at the memory system 405. For example, the set command may include an indication of the size of the circular buffer and the snapshot partition and may a quantity of snapshot partitions to establish, as well as a position of the each of the partitions. In some examples, the set command may also specify a triggering event for storing data to the snapshot partition(s). Although not shown, the memory system controller 410 may receive the set command upon the command being transmitted from the host system 425.

At 435, the memory system controller 410 may establish a circular buffer and a snapshot partition. In some examples, the memory system controller 410 may establish the circular buffer and the snapshot partition in response to receiving the set command (e.g., at 430). As described herein, the memory system 405 may include a plurality of physical blocks and, thus, the memory system controller 410 may designate a subset of the physical blocks to operate as a circular buffer.

In some instances, the memory system controller 410 may designate the first set of physical blocks 415 to operate as the circular buffer. Each physical block of the first set of physical blocks 415 may be associated with a respective LBA such that, when the memory system controller 410 receives a write command that includes an LBA within the range, associated data may be written (e.g., written sequentially) to the first set of physical blocks 415. Additionally or alternatively, the memory system controller 410 may designate the second set of physical blocks 420 to operate as the snapshot partition.

At 440, the host system 425 may transmit a write command (e.g., a third command) to the memory system 405. In some instances, the write command may be received by the memory system controller 410. As described herein, the write command may include data and a LBA.

At 445, the memory system controller 410 may determine whether the LBA included in the write command is within the range of LBAs associated with the first set of physical blocks 415. The data may be written to the first set of physical blocks 415 based on the LBA being included within the range of LBAs associated with the first set of physical blocks 415. At 450, the memory system controller 410 may write the data associated with the write command to the first set of physical blocks 415 based on the LBA associated with the write command being included within the range of LBAs associated with the first set of physical blocks 415. As described herein, the write operation may begin at a location of a cursor and may occur sequentially. Moreover, operations such as receiving a write command (e.g., at 440), determining whether a LBA is within a particular range of LBAs (e.g., at 445), and storing data to a first set of physical blocks 415 (e.g., at 450) may occur frequently on a memory system 405 operating in a black box configuration (e.g., a strictly sequential write configuration).

At 455, the memory system controller 410 may identify a triggering event. In some examples, the memory system controller 410 may identify the triggering event based on the data being stored to the first set of physical blocks 415. That is, the triggering event may occur based on a location of a cursor (e.g., a cursor 320 as described with reference to FIGS. 3A and 3B). Because the location of the cursor may be updated after a write operation, the triggering event may occur after storing the data to the first set of physical blocks 415 (e.g., at 450). Although not shown, in other examples the triggering event may occur based on receiving a command from the host system 425.

At 460, the memory system controller 410 may store a subset of the data from the first set of physical blocks 415 to the second set of physical blocks 420. In some examples, the memory system controller 410 may store the subset of data in response to identifying the triggering event. Accordingly, the memory system controller 410 may store the subset of the data to the second set of physical blocks 420 based on a location of a cursor associated with the second set of physical blocks 420. In some cases, the cursor associated with the second set of physical blocks 420 may be incremented after the subset of data is stored.

At 465, the host system 425 may transmit a get command (e.g., a second command) to the memory system 405. In some examples, as described herein, a get command may request a current location of the cursor associated with the circular buffer. In some examples, by knowing a location of the cursor, the host system 425 may be able to read a desired portion of the circular buffer without having to read the contents of the entire circular buffer. At 470, the memory system controller 410 may transmit signaling to the host system 425. In some examples, the signaling may be responsive to the get command and may include an indication of a location of the cursor associated with the circular buffer. Additionally or alternatively, although not shown in FIG. 4, a read command may occur after the signaling is transmitted to the host system 425 (e.g., at 470).

At 475, the host system 425 may transmit a write command (e.g., a second write command) to the memory system 405. The second write command may be received by the memory system controller 410 and may include second data and a LBA. At 480, the memory system controller 410 may determine whether the LBA included in the second write command is within the range of LBAs associated with the first set of physical blocks 415. The data may be written to the first set of physical blocks 415 based on the LBA being included within the range of LBAs associated with the first set of physical blocks 415.

At 485, the memory system controller 410 may write the second data associated with the write command to the first set of physical blocks 415 based on the LBA associated with the write command being included within the range of LBAs associated with the first set of physical blocks 415.

For exemplary purposes only, a location of the cursor associated with the circular buffer may be such that previously written data (e.g., the data written at 450) may be overwritten by the second data. As described herein, this may be due to the circular nature of the circular buffer. However, despite the data being overwritten, the snapshot of the data (e.g., the snapshot stored at 460, which may include at least a portion of the data) may remain stored to the snapshot partition. By utilizing a circular buffer for certain black box operations (e.g., for certain strictly sequential write operations), the associated memory system may perform write operations without the use of a L2P table, which may improve its overall life and performance. Moreover, by utilizing a snapshot partition within a circular buffer, data that would otherwise be overwritten due to the circular nature of the buffer may be preserved.

Figure 5:
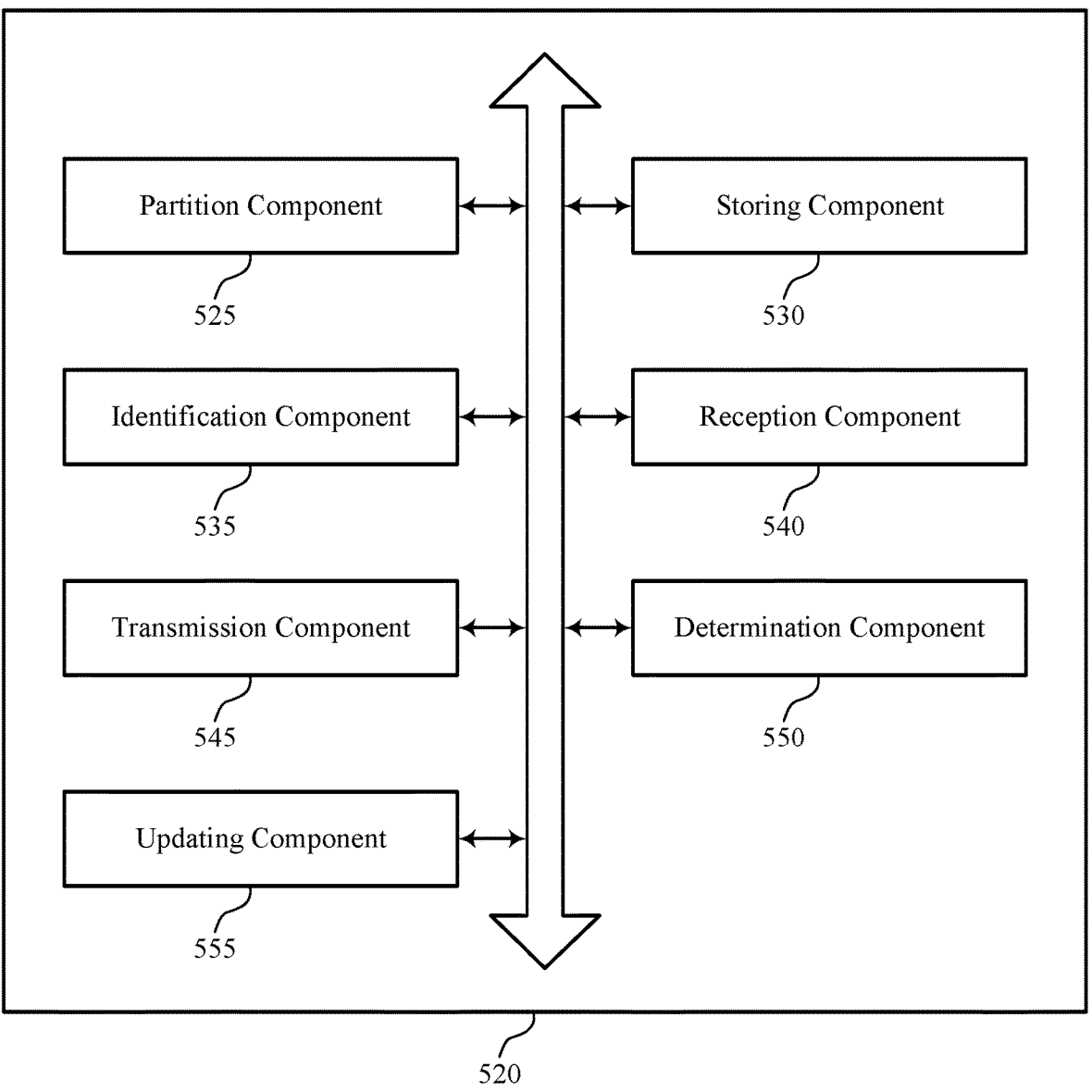
FIG. 5 shows a block diagram of a memory system controller that supports circular buffer partitions in accordance with examples as disclosed herein.

FIG. 5 shows a block diagram 500 of a memory system controller 520 that supports circular buffer partitions in accordance with examples as disclosed herein. The memory system controller 520 may be an example of aspects of a memory system controller as described with reference to FIGS. 1 through 4. The memory system controller 520, or various components thereof, may be an example of means for performing various aspects of circular buffer partitions as described herein. For example, the memory system controller 520 may include a partition component 525, a storing component 530, an identification component 535, a reception component 540, a transmission component 545, a determination component 550, an updating component 555, or any combination thereof. Each of these components may communicate, directly or indirectly, with one another (e.g., via one or more buses).

The partition component 525 may be configured as or otherwise support a means for establishing a partition within a memory device to operate as a circular buffer, where the circular buffer is associated with a first set of logical block addresses that correspond to a first set of physical block addresses. The storing component 530 may be configured as or otherwise support a means for storing first data to a first set of blocks associated with the first set of physical block addresses of the circular buffer based at least in part on a location of a cursor associated with the partition. The identification component 535 may be configured as or otherwise support a means for identifying a triggering event based at least in part on storing the first data to the first set of blocks associated with the first set of physical block addresses. In some examples, the storing component 530 may be configured as or otherwise support a means for storing a subset of the first data to a second set of blocks based at least in part on identifying the triggering event.

In some examples, the reception component 540 may be configured as or otherwise support a means for receiving a first command to establish the partition, where the first command includes a size of the partition and an indication of the first set of logical block addresses, where establishing the partition is based at least in part on receiving the first command.

In some examples, the reception component 540 may be configured as or otherwise support a means for receiving a second command that includes a request for the location of the cursor associated with the partition based at least in part on establishing the partition within the memory device. In some examples, the transmission component 545 may be configured as or otherwise support a means for transmitting, to a host device, signaling including the location of the cursor associated with the partition based at least in part on receiving the second command.

In some examples, to support identifying the triggering event, the determination component 550 may be configured as or otherwise support a means for determining that the first data was stored to the first set of blocks associated with the first set of physical block addresses.

In some examples, the reception component 540 may be configured as or otherwise support a means for receiving a third command that includes an indication to store the subset of the first data to the second set of blocks, where identifying the triggering event is based at least in part on receiving the third command.

In some examples, the determination component 550 may be configured as or otherwise support a means for determining that the cursor identifies a first logical block address included in the first set of logical block addresses, where the first logical block address corresponds to a first physical block included in the first set of blocks, where the first data is stored sequentially to the first set of blocks beginning at the first physical block based at least in part on determining that the cursor identifies the first logical block address.

In some examples, the first set of blocks includes at least the first physical block and a second physical block, and the updating component 555 may be configured as or otherwise support a means for updating the location of the cursor to be associated with a third physical block of the first set of blocks based at least in part on storing the first data to the first set of blocks.

In some examples, the second set of blocks are included in a second partition different than the partition.

In some examples, the identification component 535 may be configured as or otherwise support a means for identifying a slot of the second partition to store the subset of the first data, the slot including the second set of blocks, where storing the subset of the first data is based at least in part on identifying the slot of the second partition.

In some examples, the storing component 530 may be configured as or otherwise support a means for overwriting information stored in the second set of blocks based at least in part on slots of the second partition storing information.

In some examples, the identification component 535 may be configured as or otherwise support a means for identifying that a location of a second cursor associated with the second partition points to a first block of the second set of blocks, where storing the subset of the first data is based at least in part on identifying that the location of the second cursor points to the first block the second set of blocks.

In some examples, the storing component 530 may be configured as or otherwise support a means for overwriting the first data stored to the first set of blocks after storing the subset of the first data to the second set of blocks, where the subset of the first data is maintained in the second set of blocks after overwriting the first data stored to the first set of blocks.

In some examples, the identification component 535 may be configured as or otherwise support a means for identifying that the location of the cursor points to a first block the first set of blocks, where storing the first data to the first set of blocks is based at least in part on identifying that the location of the cursor points to the first block the first set of blocks.

In some examples, the reception component 540 may be configured as or otherwise support a means for receiving, at the memory device, a write command including the first data and a logical block address. In some examples, the determination component 550 may be configured as or otherwise support a means for determining that the logical block address of the write command is included in the first set of logical block addresses associated with the circular buffer, where identifying that the location of the cursor points to the first block the first set of blocks is based at least in part on determining that the logical block address of the write command is included in the first set of logical block addresses associated with the circular buffer.

FIG. 6 shows a flowchart illustrating a method 600 that supports circular buffer partitions in accordance with examples as disclosed herein. The operations of method 600 may be implemented by a memory system controller or its components as described herein. For example, the operations of method 600 may be performed by a memory system controller as described with reference to FIGS. 1 through 5. In some examples, a memory system controller may execute a set of instructions to control the functional elements of the device to perform the described functions. Additionally, or alternatively, the memory system controller may perform aspects of the described functions using special-purpose hardware.

At 605, the method may include establishing a partition within a memory device to operate as a circular buffer, where the circular buffer is associated with a first set of logical block addresses that correspond to a first set of physical block addresses. The operations of 605 may be performed in accordance with examples as disclosed herein. In some examples, aspects of the operations of 605 may be performed by a partition component 525 as described with reference to FIG. 5.

At 610, the method may include storing first data to a first set of blocks associated with the first set of physical block addresses of the circular buffer based at least in part on a location of a cursor associated with the partition. The operations of 610 may be performed in accordance with examples as disclosed herein. In some examples, aspects of the operations of 610 may be performed by a storing component 530 as described with reference to FIG. 5.

At 615, the method may include identifying a triggering event based at least in part on storing the first data to the first set of blocks associated with the first set of physical block addresses. The operations of 615 may be performed in accordance with examples as disclosed herein. In some examples, aspects of the operations of 615 may be performed by an identification component 535 as described with reference to FIG. 5.

At 620, the method may include storing a subset of the first data to a second set of blocks based at least in part on identifying the triggering event. The operations of 620 may be performed in accordance with examples as disclosed herein. In some examples, aspects of the operations of 620 may be performed by a storing component 530 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for establishing a partition within a memory device to operate as a circular buffer, where the circular buffer is associated with a first set of logical block addresses that correspond to a first set of physical block addresses; storing first data to a first set of blocks associated with the first set of physical block addresses of the circular buffer based at least in part on a location of a cursor associated with the partition; identifying a triggering event based at least in part on storing the first data to the first set of blocks associated with the first set of physical block addresses; and storing a subset of the first data to a second set of blocks based at least in part on identifying the triggering event.

Aspect 2: The method, apparatus, or non-transitory computer-readable medium of aspect 1, further including operations, features, circuitry, logic, means, or instructions, or any combination thereof for receiving a first command to establish the partition, where the first command includes a size of the partition and an indication of the first set of logical block addresses, where establishing the partition is based at least in part on receiving the first command.

Aspect 3: The method, apparatus, or non-transitory computer-readable medium of any of aspects 1 through 2, further including operations, features, circuitry, logic, means, or instructions, or any combination thereof for receiving a second command that includes a request for the location of the cursor associated with the partition based at least in part on establishing the partition within the memory device and transmitting, to a host device, signaling including the location of the cursor associated with the partition based at least in part on receiving the second command.

Aspect 4: The method, apparatus, or non-transitory computer-readable medium of any of aspects 1 through 3 where identifying the triggering event includes operations, features, circuitry, logic, means, or instructions, or any combination thereof for determining that the first data was stored to the first set of blocks associated with the first set of physical block addresses.

Aspect 5: The method, apparatus, or non-transitory computer-readable medium of any of aspects 1 through 4, further including operations, features, circuitry, logic, means, or instructions, or any combination thereof for receiving a third command that includes an indication to store the subset of the first data to the second set of blocks, where identifying the triggering event is based at least in part on receiving the third command.

Aspect 6: The method, apparatus, or non-transitory computer-readable medium of any of aspects 1 through 5, further including operations, features, circuitry, logic, means, or instructions, or any combination thereof for determining that the cursor identifies a first logical block address included in the first set of logical block addresses, where the first logical block address corresponds to a first physical block included in the first set of blocks, where the first data is stored sequentially to the first set of blocks beginning at the first physical block based at least in part on determining that the cursor identifies the first logical block address.

Aspect 7: The method, apparatus, or non-transitory computer-readable medium of aspect 6 where the first set of blocks includes at least the first physical block and a second physical block and the method, apparatuses, and non-transitory computer-readable medium, further includes operations, features, circuitry, logic, means, or instructions, or any combination thereof for updating the location of the cursor to be associated with a third physical block of the first set of blocks based at least in part on storing the first data to the first set of blocks.

Aspect 8: The method, apparatus, or non-transitory computer-readable medium of any of aspects 1 through 7 where the second set of blocks are included in a second partition different than the partition.

Aspect 9: The method, apparatus, or non-transitory computer-readable medium of aspect 8, further including operations, features, circuitry, logic, means, or instructions, or any combination thereof for identifying a slot of the second partition to store the subset of the first data, the slot including the second set of blocks, where storing the subset of the first data is based at least in part on identifying the slot of the second partition.

Aspect 10: The method, apparatus, or non-transitory computer-readable medium of any of aspects 8 through 9, further including operations, features, circuitry, logic, means, or instructions, or any combination thereof for overwriting information stored in the second set of blocks based at least in part on slots of the second partition storing information.

Aspect 11: The method, apparatus, or non-transitory computer-readable medium of any of aspects 8 through 10, further including operations, features, circuitry, logic, means, or instructions, or any combination thereof for identifying that a location of a second cursor associated with the second partition points to a first block of the second set of blocks, where storing the subset of the first data is based at least in part on identifying that the location of the second cursor points to the first block the second set of blocks.

Aspect 12: The method, apparatus, or non-transitory computer-readable medium of any of aspects 1 through 11, further including operations, features, circuitry, logic, means, or instructions, or any combination thereof for overwriting the first data stored to the first set of blocks after storing the subset of the first data to the second set of blocks, where the subset of the first data is maintained in the second set of blocks after overwriting the first data stored to the first set of blocks.

Aspect 13: The method, apparatus, or non-transitory computer-readable medium of any of aspects 1 through 12, further including operations, features, circuitry, logic, means, or instructions, or any combination thereof for identifying that the location of the cursor points to a first block the first set of blocks, where storing the first data to the first set of blocks is based at least in part on identifying that the location of the cursor points to the first block the first set of blocks.

Aspect 14: The method, apparatus, or non-transitory computer-readable medium of aspect 13, further including operations, features, circuitry, logic, means, or instructions, or any combination thereof for receiving, at the memory device, a write command including the first data and a logical block address and determining that the logical block address of the write command is included in the first set of logical block addresses associated with the circular buffer, where identifying that the location of the cursor points to the first block the first set of blocks is based at least in part on determining that the logical block address of the write command is included in the first set of logical block addresses associated with the circular buffer.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
receiving a first command to establish a partition and one or more second partitions within a memory device, wherein the first command indicates a quantity of partitions of the one or more second partitions;
establishing the partition within the memory device to operate as a circular buffer, wherein the circular buffer comprises a first set of physical block addresses, and wherein the circular buffer is associated with a first set of logical block addresses that correspond to the first set of physical block addresses within the partition;
establishing a second partition of the one or more second partitions within the memory device in response to the first command, wherein the second partition comprises a second set of blocks of the memory device, and wherein the second set of blocks comprises fewer memory blocks than a first set of blocks of the first set of physical block addresses;
storing first data to the first set of blocks of the first set of physical block addresses of the circular buffer based at least in part on a location of a cursor associated with the partition, wherein the first data is stored sequentially to the first set of blocks beginning at a first physical block;
identifying a triggering event based at least in part on storing the first data to the first set of blocks of the first set of physical block addresses, wherein the triggering event is associated with a sensor that is external to the memory device; and
storing a subset of the first data to the second set of blocks of the memory device based at least in part on identifying the triggering event, wherein the second set of blocks are associated with a second set of physical block addresses, and wherein the subset of the first data is maintained in the second set of blocks of the memory device when the first data stored to the first set of blocks is overwritten.

2. The method of claim 1,
wherein the first command comprises a size of the partition in physical blocks and an indication of the first set of logical block addresses, wherein establishing the partition is based at least in part on receiving the first command.

3. The method of claim 1, further comprising:
receiving a second command that comprises a request for the location of the cursor associated with the partition based at least in part on establishing the partition within the memory device; and
transmitting, to a host device, signaling comprising the location of the cursor associated with the partition based at least in part on receiving the second command.

4. The method of claim 1, further comprising:
receiving a third command that comprises an indication to store the subset of the first data to the second set of blocks.

5. The method of claim 1, further comprising:
determining that the cursor identifies a first logical block address included in the first set of logical block addresses, wherein the first logical block address corresponds to the first physical block included in the first set of blocks, wherein the first data is stored sequentially to the first set of blocks beginning at the first physical block based at least in part on determining that the cursor identifies the first logical block address.

6. The method of claim 5, wherein the first set of blocks includes at least the first physical block and a second physical block, the method further comprising:
updating the location of the cursor to be associated with a third physical block of the first set of blocks based at least in part on storing the first data to the first set of blocks.

7. The method of claim 1, wherein the second partition is located in a different position in the memory device than the partition.

8. The method of claim 7, further comprising:
identifying a slot of the second partition to store the subset of the first data, the slot comprising the second set of blocks, wherein storing the subset of the first data is based at least in part on identifying the slot of the second partition.

9. The method of claim 7, further comprising:
overwriting information stored in the second set of blocks based at least in part on slots of the second partition storing information.

10. The method of claim 7, further comprising:
identifying that a location of a second cursor associated with the second partition points to a first block of the second set of blocks, wherein storing the subset of the first data is based at least in part on identifying that the location of the second cursor points to the first block of the second set of blocks.

11. The method of claim 1, further comprising:
overwriting the first data stored to the first set of blocks after storing the subset of the first data to the second set of blocks.

12. The method of claim 1, further comprising:
identifying that the location of the cursor points to a first block the first set of blocks, wherein storing the first data to the first set of blocks is based at least in part on identifying that the location of the cursor points to the first block of the first set of blocks.

13. The method of claim 12, further comprising:
receiving, at the memory device, a write command comprising the first data and a logical block address; and
determining that the logical block address of the write command is included in the first set of logical block addresses associated with the circular buffer, wherein identifying that the location of the cursor points to the first block of the first set of blocks is based at least in part on determining that the logical block address of the write command is included in the first set of logical block addresses associated with the circular buffer.

14. An apparatus, comprising:

a memory device comprising a plurality of memory cells; and a controller coupled with the memory device, wherein the controller is configured to cause the apparatus to:

receive a first command to establish a partition and one or more second partitions within the memory device, wherein the first command indicates a quantity of partitions of the one or more second partitions;

establish the partition within the memory device to operate as a circular buffer, wherein the circular buffer comprises a first set of physical block addresses, and wherein the circular buffer is associated with a first set of logical block addresses that correspond to the first set of physical block addresses within the partition;

establish a second partition of the one or more second partitions within the memory device in response to the first command, wherein the second partition comprises a second set of blocks of the memory device, and wherein the second set of blocks comprises fewer memory blocks than a first set of blocks of the first set of physical block addresses;

store first data to the first set of blocks of the first set of physical block addresses of the circular buffer based at least in part on a location of a cursor associated with the partition, wherein the first data is stored sequentially to the first set of blocks beginning at a first physical block;

identify a triggering event based at least in part on storing the first data to the first set of blocks of the first set of physical block addresses, wherein the triggering event is associated with a sensor that is external to the memory device; and store a subset of the first data to the second set of blocks of the memory device based at least in part on identifying the triggering event, wherein the second set of blocks are associated with a second set of physical block addresses, and wherein the subset of the first data is maintained in the second set of blocks of the memory device when the first data stored to the first set of blocks is overwritten.

15. The apparatus of claim 14, wherein the first command comprises a size of the partition in physical blocks and an indication of the first set of logical block addresses, wherein establishing the partition is based at least in part on receiving the first command.

16. The apparatus of claim 14, wherein the controller is further configured to cause the apparatus to:

receive a second command that comprises a request for the location of the cursor associated with the partition based at least in part on establishing the partition within the memory device; and transmit, to a host device, signaling comprising the location of the cursor associated with the partition based at least in part on receiving the second command.

17. The apparatus of claim 14, wherein the controller is further configured to cause the apparatus to:

receive a third command that comprises an indication to store the subset of the first data to the second set of blocks.

18. The apparatus of claim 14, wherein the controller is further configured to cause the apparatus to:

determine that the cursor identifies a first logical block address included in the first set of logical block addresses, wherein the first logical block address corresponds to the first physical block included in the first set of blocks, wherein the first data is stored sequentially to the first set of blocks beginning at the first physical block based at least in part on determining that the cursor identifies the first logical block address.

19. The apparatus of claim 18, wherein the first set of blocks includes at least the first physical block and a second physical block, and the controller is further configured to cause the apparatus to:

update the location of the cursor to be associated with a third physical block of the first set of blocks based at least in part on storing the first data to the first set of blocks.

20. The apparatus of claim 14, wherein the second partition is located in a different position in the memory device than the partition.

21. The apparatus of claim 20, wherein the controller is further configured to cause the apparatus to:

identify a slot of the second partition to store the subset of the first data, the slot comprising the second set of blocks, wherein storing the subset of the first data is based at least in part on identifying the slot of the second partition.

22. The apparatus of claim 14, wherein the controller is further configured to cause the apparatus to:

overwrite the first data stored to the first set of blocks after storing the subset of the first data to the second set of blocks.

23. A non-transitory computer-readable medium storing code, the code comprising instructions executable by a processor to:

receive a first command to establish a partition and one or more second partitions within a memory device, wherein the first command indicates a quantity of partitions of the one or more second partitions;

establish the partition within the memory device to operate as a circular buffer, wherein the circular buffer comprises a first set of physical block addresses, and wherein the circular buffer is associated with a first set of logical block addresses that correspond to the first set of physical block addresses within the partition;

establish a second partition of the one or more second partitions within the memory device in response to the first command, wherein the second partition comprises a second set of blocks of the memory device, and wherein the second set of blocks comprises fewer memory blocks than a first set of blocks of the first set of physical block addresses;

store first data to the first set of blocks of the first set of physical block addresses of the circular buffer based at least in part on a location of a cursor associated with the partition, wherein the first data is stored sequentially to the first set of blocks beginning at a first physical block;

identify a triggering event based at least in part on storing the first data to the first set of blocks of the first set of physical block addresses, wherein the triggering event is associated with a sensor that is external to the memory device; and store a subset of the first data to the second set of blocks of the memory device based at least in part on identifying the triggering event, wherein the second set of blocks are associated with a second set of physical block addresses, and wherein the subset of the first data is maintained in the second set of blocks of the memory device when the first data stored to the first set of blocks is overwritten.

\* \* \* \* \*